(No Model.)
J. F. STEWARD.
HARVESTER.
No. 315,567. Patented Apr. 14, 1885.
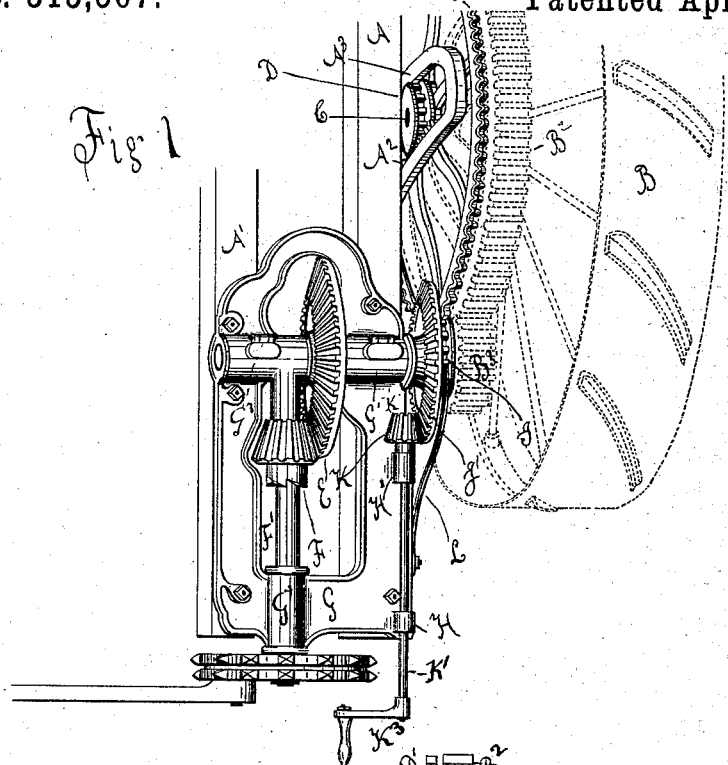
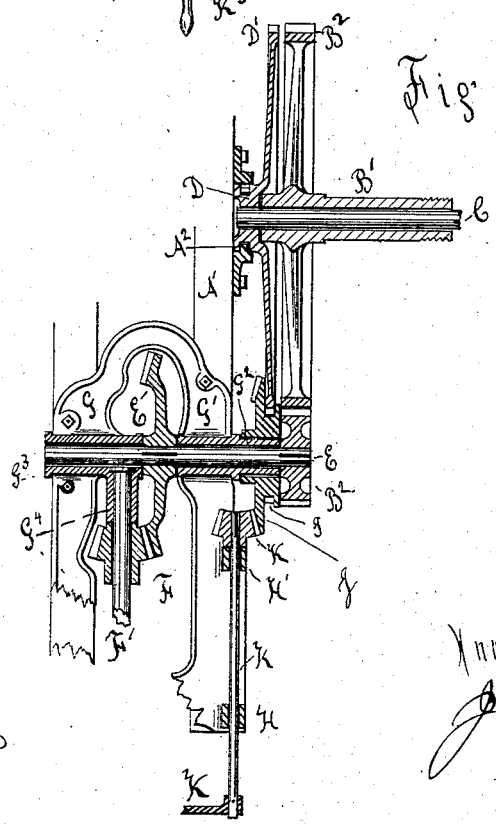
Witnesses.
Wm A Johnson
E. F. Gaddis
Inventor
John F. Steward

UNITED STATES PATENT OFFICE.

JOHN F. STEWARD, OF CHICAGO, ILLINOIS.

HARVESTER.

SPECIFICATION forming part of Letters Patent No. 315,567, dated April 14, 1885.

Application filed March 1, 1884. (No model.)

*To all whom it may concern:*

Be it known that I, JOHN F. STEWARD, of Chicago, in the county of Cook and State of Illinois, have invented certain new and useful Improvements in Harvesters, of which the following is a full description, reference being had to the accompanying drawings.

The object of my invention is to improve the raising and lowering device described and claimed in Patent No. 257,562, May 9, 1882, to Steward and Dixon, and its nature will be fully pointed out.

In the drawings, Figure 1 is a perspective view showing the parts as if seen from a point above and somewhat to the left. Fig. 2 is a sectional plan view.

A and A' are the ordinary gear-sills of a harvester. To the sill A is bolted the curved loop-shaped bracket $A^3$, in which the teeth $A^2$ are provided.

B is the master-wheel. (Shown only in dotted lines, but clearly enough to show its relation to the parts with which in practice it is associated.)

B' is the hub, upon which is the gear $B^2$, for giving motion to the harvester-gearing.

$B^3$ is a spur-pinion keyed to the shaft E. E' is a bevel-gear keyed to the same shaft, and adapted to mesh with the pinion F on the shaft F'.

G is the gear-frame, having the bearings G', $G^3$, and $G^4$ for the shafts E and F.

C is the axle upon which the traction-wheel freely revolves. Upon each end of the axle a pinion is firmly secured. (But one, however, is here shown.) As one piece with the pinion D is the gear D', of diameter preferably not greater than that of gear $B^2$.

I make all of the parts of my device as light as possible, and to do this I make the gear D' of malleable cast-iron.

In the patent above referred to the gear D' is shown as secured to the axle-pinion upon the opposite side of the wheel from the gear $B^2$, and thus exposed to danger, outstanding, as it does, from sheltering parts. Its lightness would be its weakness if unprotected. The gear $B^2$ will now be treated in its capacity as a protection to gear D', which it well forms, being strong in proportion to its labor—that of driving the harvester-gearing—and thus strong, being competent to resist the shocks incident to a wheel in such an exposed position, from careless driving in passing over stumps and stones. Treating this gear, then, in its secondary capacity, it acts as a disk substantially equal to or greater in diameter than the light gear D', placed upon the axis of the latter, and thus compelled to rise and fall simultaneously, and at all times to preserve proper relation. The protection afforded is akin to that of a circular saw, when, by means of a bolt inserted through its eye, it is secured beside a disk of wood of equal size for shipment. Although wholly exposed on one side, it can but be forced against the disk, and danger cannot approach it from the other side. The gear thus forms, although, strictly speaking, not a perfect, yet a very effective shield.

It is not by the mere transposition of the gear D' that the feature of protection is introduced, because, if a disk were placed beside the similar gear in the patent referred to, this feature of my improvement would be applied to that.

I make the bearing G' as long as possible, making that part $G^2$ cylindrical and project it well out beyond the margin of the frame. On this sleeve $G^2$, I place the pinion I. The radius of the sector $A^3$ is equal to the sum of the radii of the pitch-circles of the gear $B^2$ and the pinion $B^3$, so that as the axle C is moved up or down in said sector-bracket the mesh of the gears is undisturbed, and I make the sum of the radii of the gears D' and pinion I equal that of $B^2$ and $B^3$.

It is plain that if I be rotated the axle-pinion will be rolled relatively up or down in the sector-bracket. The master-wheel resting on the ground, however, the frame must rise and fall.

For convenience in rotating the pinion I, gearing is provided, the bevel-gear I' being made as one piece with I.

H H' are bearings on the frame G, in which the shaft K' may rotate.

On the shaft K', I place the pinion K in proper position to mesh with the gear I'.

$K^3$ is a crank by which the last-named shaft is rotated, and thus the machine raised or lowered at will.

To retain the parts in any position of adjustment, it is but necessary to lock the gears from revolving. This I do by means of the hook L, adapted and so situated as to engage the teeth of the pinion I.

By the arrangement shown I am enabled to give pinions B³ and I not only coincident axes, but a support in common by the sleeve G², which renders displacement relative to each other impossible, while in the patent referred to the rocking of the frame of the harvester necessarily produces disturbance of the relative positions of the two axes.

What I claim is—

1. The axle-supporting sector A², the axle provided with the pinion D and gear D', and forming a common axis for said gear and pinion, and the gear B², the frame G having the sleeve G², adapted to form a support in common for the pinions B³ and I, all combined substantially as described.

2. The frame G, constructed and arranged substantially as described, whereby it is adapted to form a support in common for the shafts E F' K' and the gear I, as set forth.

3. The combination, with the gear D', of the gear-wheel B², when adapted to perform the office of a protecting-disk supported on the axle, and thus adapted to rise and fall with said gear D' and form a protection thereto, substantially as described.

JOHN F. STEWARD.

Witnesses:
E. T. GADDIS,
WM. A. JOHNSON.